United States Patent [19]

Morse et al.

[11] 4,023,936

[45] May 17, 1977

[54] TITANIUM CLAD STEEL AND PROCESS FOR MAKING

[75] Inventors: Stephen Lewis Morse, Downingtown; James J. McGlynn, Paoli, both of Pa.

[73] Assignee: Lukens Steel Company, Coatesville, Pa.

[22] Filed: June 14, 1976

[21] Appl. No.: 695,372

[52] U.S. Cl. .............................. 428/679; 228/186; 228/190; 228/235; 428/680; 428/926

[51] Int. Cl.² .................. B32B 15/18; B23K 31/02

[58] Field of Search ............... 228/186, 190, 235; 29/196.6, 198

[56] References Cited

UNITED STATES PATENTS

| 3,015,885 | 1/1962 | McEuen et al. | 29/198 |
| 3,121,949 | 2/1964 | Wright, Jr. | 228/186 |
| 3,854,891 | 12/1974 | Chivinsky | 29/198 |

FOREIGN PATENTS OR APPLICATIONS

| 759,413 | 10/1956 | United Kingdom | 29/198 |

Primary Examiner—Arthur J. Steiner
Attorney, Agent, or Firm—Mason, Mason & Albright

[57] ABSTRACT

A nickel innerlayer is sandwiched between a steel plate and a titanium plate in a steel assembly, the assembly being hermetically sealed and reduced in a hot rolling operation which results in a metallurgical bond with greatly improved ductility as measured by bending and shear tests. The nickel layer contains not more than 0.03 percent carbon and not less than about 0.05 percent of a carbide former in a ratio of between about 4–35 of carbide former to one of carbon.

9 Claims, No Drawings

TITANIUM CLAD STEEL AND PROCESS FOR MAKING

BACKGROUND OF THE INVENTION

The invention relates to a titanium clad steel plate and the process for producing same wherein a nickel sheet is interposed between plates of titanium and steel and the composite is reduced by hot rolling.

Presently, for many applications, the most commercially successful method of producing titanium clad steel is through an explosive bonding process. Such a process has, however, serious drawbacks which attend the utilization of explosives with their inherent dangers and safety requirements. Furthermore, such bonds seen in cross-section are generally of wave form and thus the depth of the bond varies significantly from crest to trough with a resultant increased requirement for the cladding metal.

Other than the explosive bonding process for making titanium clad steel, it is known to utilize a commercially pure nickel sheet as the bonding metal between the titanium and the steel. However, steel so produced has not been sufficiently ductile for many uses desired of the titanium clad steel.

Thus a need exists for a titanium clad steel having comparable or better physical and mechanical properties than, and otherwise being competitive with, explosive bonded titanium clad products already on the market and, to this end, a reliable and reproducible method for producing same which assures uniform bond characteristics is required.

SUMMARY OF THE INVENTION

The inventors have discovered that with the substitution of a low carbon stabilized nickel sheet for a commercially pure nickel sheet heretofore used in the process, a dramatic improvement in the ductility of the titanium clad steel results as measured by bending and shear tests. For example, it has been found that the average sheer strengths increase from approximately a 16,000 psi to approximately 28,000 psi with this modification and that the limiting bend ratios have been improved from R/T = 3.2 to R/T = 0.5.

In the method of the instant invention, the intermediate nickel sheet preferably contains not more than 0.03 percent carbon and not less than about 0.05 percent of a carbide former which, where higher than such minimum of 0.05 percent, the ratio of the carbide former to the carbide is about 4–35 of carbide former to one of carbon. In other words, the weight of carbide forming elements should be between four and 35 times the weight of the carbon in the nickel sheet but the carbide forming elements should, in any event, be not less than approximately 0.05 percent of the nickel composition in weight. The sandwich with such a nickel sheet together with titanium on one side and the steel backing plate on the other is sealed hermetically insofar as interior surfaces are concerned and the resulting assembly is heated to a temperature of about 1650° – 1700° F and thereinafter rolled sufficiently to produce a metallurgical bond between the plates so that the titanium clad steel produced is characterized by a high relative ductility such that specimens rolled to one-half inch gauge may, in the as-rolled condition, be bent with the titanium in compression without the bond cracking or separating to a one-half inch interior diameter at 180°. In addition, the average bond shear strength of the titanium/nickel interface is in excess of 25,000 psi — actually an average of about 27,900 psi. This compares with shear strengths obtained utilizing a pure nickel bonded titanium clad steel wherein the averages are approximately 15,500 psi.

In the composite metal, the nickel interfaced sheets, in as-rolled condition, preferably is not less than 1/32 inch in thickness.

The term "carbide former" is applied to elements which have a strong affinity for carbon. This includes elements such as titanium, columbium (also known as niobium), zirconium, tantalum, vanadium, chromium, molybdenum, tungsten, uranium, boron, and cobalt. Carbide formers are also known as carbide stabilizers.

In research involving this invention, titanium has been found preferable as a carbide former for the nickel interface sheet because, although the use of columbium as a carbide former resulted in a somewhat higher shear strength it also appeared that bond breaks at the bond interface were more likely with the columbium than with the titanium.

The resulting titanium clad product combines the advantages of clad steel in general with the advantages of titanium metal, that is, its unique corrosive resistance. The primary advantage obtained over the prior art is the ability to roll bonds at hot rolling temperatures to produce the titanium clad steel without the requirement for a protective atmosphere in the assembly being rolled or evacuation of the assembly for the purpose of the rolling step.

DESCRIPTION OF THE PREFERRED EMBODIMENTS

In seeking a method of manufacture for a bonded titanium metal, the inventors desired that a roll bonding be utilized which was compatible with 1650° – 1700° F as a lower temperature limit and that external pack evacuation and argon flushing procedures be eliminated from consideration.

It is noted that when titanium and steel are hot roll bonded in direct contact with each other, brittle intermetallic compounds result causing a generally unsatisfactory bond. For this reason, it is necessary to insert a third metal between the titanium and steel having bonding characteristics which are mutually compatible with both metals.

Although the prior art suggests a third metal interlayer of nickel, cobalt, palladium, platinum, iron, copper, and copper nickel alloys, it has been the experience of the inventors that nickel is the only base metal so far found suitable for the interlayer at hot rolling temperatures as well as being the most practicable. However, experiments with such interlayers in the form of commercially pure nickel have resulted in unsatisfactory products insofar as ductility was concerned.

An important aspect of the instant invention is the discovery by the inventors that through the addition of proper amounts of carbide formers, dramatic improvements in ductility of titanium clad steel results.

These results were ascertained through tests performed on five assemblies which were constructed. Each assembly was a nominal four-ply type in that each assembly contained two titanium inserts and two backing steels. However, three further metal layers were utilized — one being a one-tenth inch thick steel sheet utilized for parting purposes and two nickel sheets one-tenth inch thick each, for bonding the titanium inserts to the backing steels. Steel separating sheets were used in each pack in view of past experience indicating that the parting compound normally used for stainless steel clad plates and the like was not practicable for titanium clad assemblies.

The backing steels for each of the five assemblies were ASTM A515 (0.29% carbon), approximately one inch gauge and 10½ inches by 12½ inches rectangular plates. Each steel backing plate was prepared by machining the surfaces to be bonded to clean metal and then blasting same with a steel grit. The titanium inserts, which were also rectangular, 1/4 inch × 8 inches × 10 inches, consisted of commercially pure ASTM B265 grade 1 titanium. Such inserts were ground by Number 60 mesh silicon carbide belts, then dipped into a nitric-hydrofluoric acid mixture to clean the surfaces and finally reground on one side. However, in one of the assemblies, the titanium inserts were merely pickled in nitric-hydrofluoric acid.

The nickel bonding sheets were of two types. One type contained 0.15% columbium and the other contained 0.05% titanium. These nickel plates were roughly sliced on a saw and ground to smooth sheets 1/10 inch to 9/64 inch thick. Finally, they were lightly pickled in acid to clean the surfaces.

The assemblies as previously described were welded closed around the edges in order to provide a hermetically sealed interior. No vents were provided; insteas the inner surfaces of the side bars were previously flame sprayed to produce a 0.005% thickness of aluminum which functioned as a getter for the enclosed air in the sealed assemblies when heated for rolling.

For rolling, the assemblies were charged each charged into a furnace having a temperature of about 1200 F° and held for 2 hours. Next the furnace temperature was increased to heat each assembly to a maximum of 1650° – 1700° F. and each assembly was held at such temperature for one hour per inch of assembly thickness. Subsequently, the assemblies were removed.

The assemblies were rolled in a rolling mill having 30 inches wide rolls of 15 inches wide smooth rolling surfaces.

With the exception of one assembly which was reduced by a ratio of 1.58 to 1, the other assemblies were each reduced 3.0 to 1.

Ultrasonic examination of the clad plates obtained from the five assemblies indicated substantially all of them had good metallurgic bonds.

Plates from two of the assemblies were cut into 1½ wide specimens for face bending. Further specimens for face bends and side bends tests were cut from the clad plates from the other three assemblies. The bend tests disclose that out of the total of 68 face bends including 42 bends with the titanium cladding bent in tension and 26 bent with the titanium in compression, all were bent without bond cracking or separation to 1½ inches interior diameter and 180° angle of bend. Subsequently, 50 of these bends were flattened in a press to one-half inch interior diameter 180°. All so tested were so bent without breaking or cracking of the bonds. Only by further flattening to one-fourth inch interior diameter on thirty-three of the specimens was cracking of the bond zone achieved in some six specimens with, however, the other twenty-seven being bent successfully — or 82% of the number tested. In this connection, the nickel innerlayer alloyed with titanium proved superior in that 21 of 23 flattened to one-fourth inch interior diameter did not crack.

From these tests, it appears that an R/T value of one-half is valid and tests with a 0.975 inch gauge assembly indicate that an R/T value of three-fourths is also valid. It is to be emphasized that these bend ratios considerably exceed those of an R/T of 3.2 attained on titanium clad which is made by using pure nickel (200 grade) innerlayers.

Side bends were made on specimens cut from three of the clad plates and a total of thirty-eight side bends were made. The individual specimens were ⅜ inch wide × ½ inch gauge. They were first bent to 180° over 1½ inch diameter and then press flattened to one-fourth inch interior diameter. All such bends proved successful with none cracking or separating at the bond joints.

A total of 23 shear tests were conducted. The shear tests specimens were cut from the flattened portions of the bend specimens. The shear test blocks were prepared by carefully machining the nib so that the shearing force would be applied at the titanium/nickel interface which is the weakest joint in the clad plates. The average value obtained for the twenty-three titanium clad shear tests was 27,926 psi with only two of the tests being below 20,000 psi. In comparison, shear tests on titanium clad previously made with nickel (type 200) as a bonding innerlayer averaged 15,500 psi.

The shear value did not show any significant differences related to whether a columbium nickel or titanium nickel alloy innerlayer was used as a bonding metal and there were no significant differences related as to how the nib was oriented with respect to the rolling direction. However, it should be pointed out that shear tests from the assembly which was rolled reduced by a ratio of only 1.58 to 1 were substantially lower in value than the average, 12,692 and 20,568 psi being obtained.

In some of the tests, curves of load versus strain were obtained. The average strain (elastic plus elastic to load peak) shown during the shear testing on six of the titanium nickel alloy bonded titanium clads was 11.1% with a range of 7.2 to 16.7%. The average strain shown on columbium nickel alloy bonded titanium clads was 12% in a range of 7.6 to 14.5% and thus not significantly different. In contrast, the strain shown during the shear testing of titanium specimens with pure nickel joints was 5.6%. Accordingly, the clad joints with the stabilized nickel alloy compositions are about twice as ductile as clad joints in the previously made titanium clad of pure nickel bond joints.

In microscopic examination, the titanium clads made with the carbon stabilized nickel bonding metal appear to have cleaner bond zones and less marked island formation than observed in the titanium clads made with commercially pure nickel bonding metal.

Five specimens of a titanium clad steel (all reduced by rolling by a 3–1 ratio) were scanned for carbon, titanium and nickel in a microprobe examination. One of the specimens had a pure nickel bond joint and was shown to contain carbon at the bond joint. Very little carbon was found in bond zones of the other four specimens, two of which had the titanium nickel bond joint and the other two, the columbium nickel bond joint. It appeared that intermetallic formations in the bond zones of the four specimens had a relatively narrow width. In two of the specimens (the pure nickel and a columbium nickel bond), a continuous line of carbon was present. However, there appeared to be about 25% more carbon in the pure nickel bond zone. Only by hunting could the operator of the electron probe find localized spots in the bond zones of the other specimens where some carbon was present. It is hypothesized, that the line of carbon where it appears indicates that the carbon stabilized nickel is only partly effective at the location wherein the microprobe scans were made.

A further important finding is that subsequent heating of the titanium steel clad increases the amount of intermetallic compounds in the bond zone thus causing same to become brittle with a resulting deterioration of the ductility of the bond. However, most clad metal fabrication practices do not require a heating of the metal to temperatures wherein the intermetallic bonds are substantially embrittled.

The amount of carbide former needed can be expressed in terms of the carbon present in the nickel interlayer. As previously indicated, the carbon content should be kept very low, less than about 0.03% carbon being preferred. The following is a list of preferred ratios of various elements to carbon to be contained in the nickel interlayer:

| Element | Ratios |
|---------|--------|
| Ti | 4 |
| Cb. | 9–12 |
| Zr. | 9 |
| V. | 4–9 |
| Ta. | 18–30 |
| Cr. | 4–6–8 |
| Mo. | 9–18 |
| W. | 35 |

With the carbon content of the nickel interlayer being not more than about 0.03%, titanium is preferably in a range of about 0.05% to 0.20% and columbium is preferably in a range of about 0.10% to 0.40%.

Although we have described the preferred embodiments of our invention, it is to be understood that it is capable of other adaptations and modifications within the scope of the appended claims. In such claims and in the specification where percentage of content are set forth, such percentages refer to percentage by weight.

Having thus described our invention, what we claim as new and desirable to secure by Letters Patent of the United States is:

1. A method for producing a titanium clad steel which comprises the steps of providing:
   a first plate of carbon steel;
   providing a second plate of nickel containing nor more than 0.03% carbon and not less than about 0.05% of a carbide former which where higher than said minimum of 0.05% is in a ratio of about 4–35 of carbide former to 1 of carbon;
   providing a third plate of titanium and sandwiching said second plate in a face-to-face contact between said first and third plates into an assembly, hermetically sealing at least second plate within said assembly, heating said assembly to a temperature of about 1650°–1700° F., and rolling said assembly at said temperature sufficiently to produce a metallurgical bond between said plates which is characterized by a high relative ductility whereby specimens rolled to ½ inch gauge in the as-rolled condition may be bent with the titanium in compression or tension or both in side bends without bond cracking or separation to a one-half inch interior diameter and 180°.

2. A method in accordance with claim 1, wherein the reduction to assembly achieved by said rolling is about 3 to 1.

3. A method in accordance with claim 1, wherein said carbide former is selected from a group consisting of titanium and columbium.

4. A method in accordance with claim 1, wherein said nickel plate is rolled within the said assembly to a thickness of not less than one thirty-second inch.

5. A titanium clad steel which is comprised of three layers which are metallurgically bonded together by rolling at a temperature of about 1650° to 1700° F., said three layers consisting essentially of a first layer of steel, a second layer of nickel and a third layer of titanium, said nickel layer containing not more than 0.03% carbon and not less than about 0.05% of a carbide former which where it is higher than said minimum of said 0.05% is in ratio of about 4–35 of carbide former to 1 of carbon, said titanium clad steel being characterized by high relative ductility whereby specimens rolled to ½ inch gauge in the as-rolled condition may be bent with the titanium in compression or tension or both in side bends without bond cracking or separation to a one-half inch interior diameter and 180°.

6. A titanium clad steel in accordance with claim 5, wherein said carbide former is from the group consisting of titanium, columbium, zirconium, vanadium, tantalum, chromium, molybdenum, and tungsten.

7. A titanium clad steel plate in accordance with claim 6, wherein said carbide former is from the group consisting of titanium and columbium.

8. A titanium clad steel plate in accordance with claim 5, wherein the minimum thickness of said nickel layer in the as-rolled condition is one thirty-second inch.

9. A titanium clad steel plate in accordance with claim 5 being characterized by an average shear strength at the titanium/nickel interface of in excess of 25,000 psi.

* * * * *